United States Patent [19]

Nelson et al.

[11] 4,069,502
[45] Jan. 17, 1978

[54] METHODS OF OPERATING PYROELECTRIC CAMERA TUBES

[75] Inventors: Peter David Nelson, Chelmsford; Peter Baldwin Banks, Wickford, both of England

[73] Assignee: English Electric Valve Company Limited, England

[21] Appl. No.: 696,035

[22] Filed: June 14, 1976

[30] Foreign Application Priority Data

June 28, 1975 United Kingdom ............... 27425/75

[51] Int. Cl.$^2$ ........................................... H04N 5/33
[52] U.S. Cl. ................................. 358/113; 358/165; 315/384; 250/333
[58] Field of Search ................. 315/384, 385, 381, 10; 358/110, 113, 165; 250/330, 333

[56] References Cited

U.S. PATENT DOCUMENTS

| | | | |
|---|---|---|---|
| 3,812,396 | 5/1974 | Crowell | 250/332 |
| 3,946,232 | 3/1976 | Harmer | 315/10 |

*Primary Examiner*—Maynard R. Wilbur
*Assistant Examiner*—T. M. Blum
*Attorney, Agent, or Firm*—Diller, Brown, Ramik & Wight

[57] ABSTRACT

A method of operating a pyroelectric camera tube having a normally provided electron beam emitting cathode and control grid $G_1$ controlling the electron beam, and a gas in the interior space of the tube by applying positively-going pulses to the grid $G_1$ during the period of the normally applied line blanking pulses. A circuit for producing the positively-going pulses is also disclosed which have the effect of increasing the target pedestal potential.

7 Claims, 4 Drawing Figures

METHODS OF OPERATING PYROELECTRIC CAMERA TUBES

This invention relates to pyroelectric camera tubes.

It is known that a pyroelectric camera tube has a target electrode that is sensitive to temperature changes of viewed scenes and such targets may be formed from, for example, triglycine sulphate. The target may be considered as a plurality of elemental capacitors which are charged in dependence upon the temperature of the viewed scene projected onto the front surface of the target and which elemental capacitors are discharged to a predetermined reference potential by an electron beam which scans the rear surface of the target. The resulting elemental capacitor discharging current is taken from a signal plate on the front surface of the target and fed to a video amplifier for utilisation in the customary fashion. For satisfactory tube operation, so that the beam lands on the target orthogonally, a mesh electrode is disposed a small distance from the rear surface of the target.

Before the target can be used it must be "poled" either "black-moving", in which condition hot viewed objects appear black, or "white-moving", in which condition hot objects appear white. The target, which comprises a plurality of internal electric dipoles, is poled black-moving by applying an electric field between the front and rear surface thereof such that the front surface is raised positively with respect to the rear surface; a converse polarity of electric field is applied to pole the target white-moving.

In one mode of operation known as "cathode potential stabilised" (CPS) the target is maintained at near the electron beam producing cathode potential and the target is stabilised due to being driven negatively towards the cathode potential by the electron beam until no more electrons are able to land thereon. This mode tends to suffer from the defect that only objects producing a positively charged image on the target can be read. Thus, to take a an example a target that is poled white-moving, objects thermally greater than room temperature will produce a positive charge on the target resulting in a white image, but on removal of the hot object the target falls below cathode potential, and objects lower than room temperature also produce a negative charge on the target that cannot be discharged by the scanning electron beam and so cannot be viewed. Furthermore, the tube operated in such a manner tends to have a slow picture response so that moving objects are blurred.

A known method of reducing the forementioned disadvantages of the CPS mode of operation when the target has a high resistivity (greater than, say, $10^{11} \Omega cm$) is to fill the tube volume at the rear of the target with a gas, usually of helium, which is ionised by the electron beam to produce a small positive "pedestal" potential on the target (typically 0.2v). Thus negative charges on the target produced by viewed objects of slightly less than room temperature, provided that this charge is less than the positive charge corresponding to the pedestal potential, can now be discharged to produce a signal output and resulting optical image. The speed with which small varying charges on the target can be discharged may be increased by introducing a greater quantity of gas into the tube, but this has the disadvantage of increasing the number of gas ions falling on the cathode, resulting in damage to the cathode and reduction of the electron beam current emitted by it.

One object of the present invention is to provide a method of operating a pyroelectric camera tube in which an increased pedestal potential is produced.

According to this invention a method of operating a pyroelectric camera tube having an electron beam emitting cathode, a control grid $G_1$ controlling the electron beam and a gas in the interior space of the tube includes the steps of applying line blanking pulses to the cathode and positively-going pulses to the grid $G_1$ during the period of the line blanking pulses such that an increased pedestal potential is produced.

According to a feature of this invention a circuit arrangement includes a pyroelectric camera tube having an electron beam emitting cathode, a control grid $G_1$ controlling the electron beam and a gas in the interior space of the tube and means for applying positively-going pulses to the grid $G_1$ during the period of line blanking such that an increased pedestal potential is produced.

The gas employed in the tube may be inert or a hydrogen gas.

Preferably the amplitude of the positively-going pulses is adjustable.

The invention will now be described, by way of example, with reference to the accompanying drawings. in which.

Figure 1:
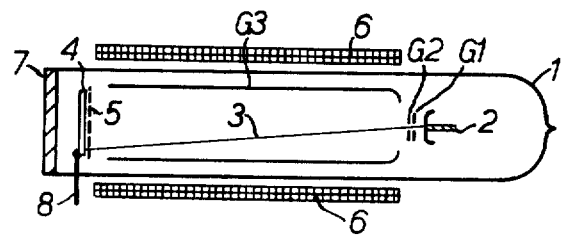
FIG. 1 shows a schematic diagram of pyroelectric camera tube for use in accordance with the method of the present invention.

The pyroelectric camera tube shown in FIG. 1 includes, within a sealed envelope 1, a cathode 2 for producing an electron beam 3 which is directed towards a triglycine sulphate target 4 and mesh 5 by a control grid $G_1$, a first anode $G_2$ and a wall anode $G_3$. The electron beam 3 is scanned over the rear of the target 4 surface of focussing and scanning coils 6 and signals produced by the discharge of target elemental capacitors (not shown) are transferred for utilisation over signal lead 8. Positioned in front of the target 4 and forming a closure for the tube is a germanium window 7 which transmits thermal energy to the target 4.

Figure 2:
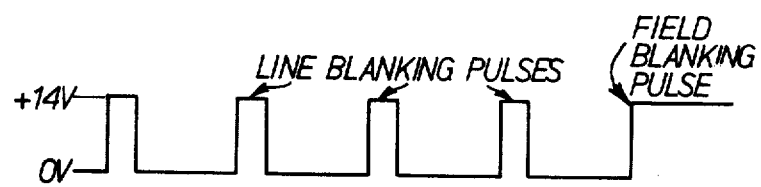
FIGS. 2 and 3 are graphs showing the relative times of occurrence of line blanking and grid $G_1$ pulses.respectively
Figure 3:
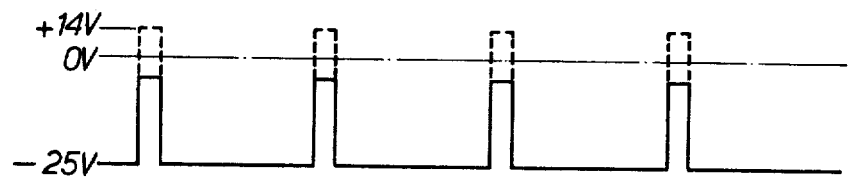
Figure 4:
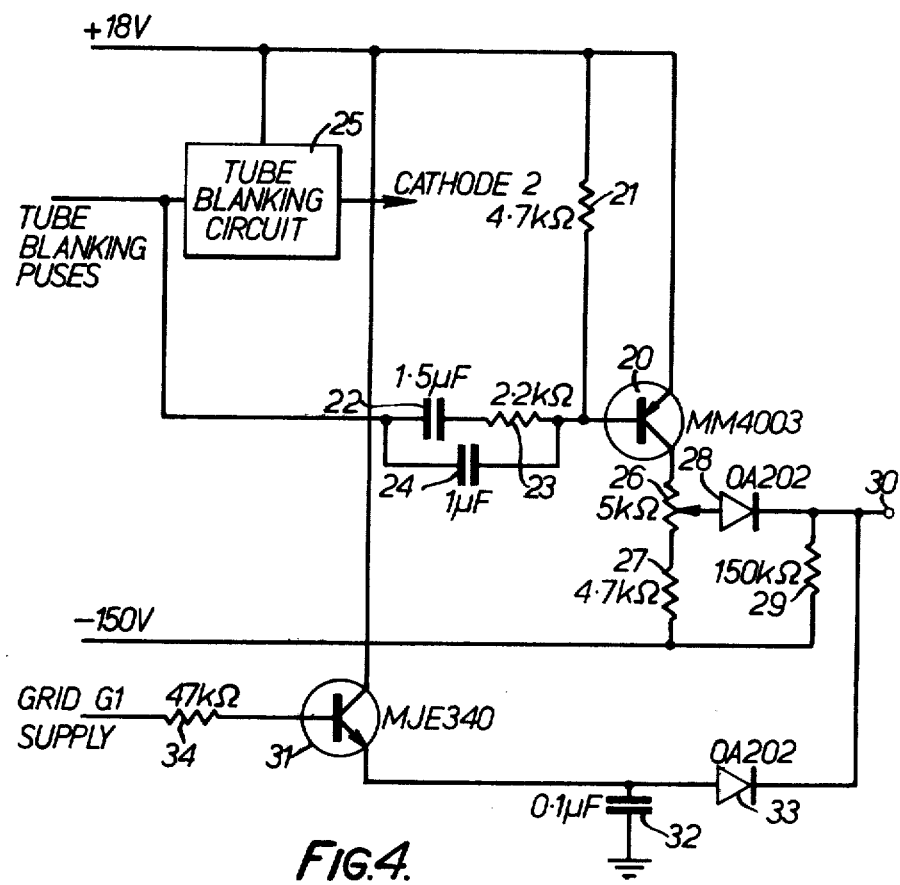
FIG. 4 shows a circuit diagram for producing the grid $G_1$ pulses.

The operating potentials are fed to the appropriate electrodes from a camera unit, part of which is shown in FIG. 4, the potentials applied to the cathode and grid $G_1$ being shown in FIGS. 2 and 3 where an abscissa of time (seconds) is shown against ordinates of voltage.

Referring to FIG. 2, the graph shows the normally applied line blanking pulses, that is, the positive-going pulses that are applied to the cathode during line (and field) flyback to ensure that the cathode is positive with respect to the target so that the electron beam does not land on the target, although positive gas ions are produced by collision of the electron beam with the gas molecules and land on the target.

FIG. 3 shows the pulses which are applied to the grid $G_1$ during the period of the line blanking pulses and which extend from the electron beam read-out level of -25V in a positive direction. The amplitude of the positively-going pulses is adjustable (as shown by the broken lines) up to a maximum of +14V at which potential the electron beam current is at a maximum.

The circuit shown in FIG. 4 for producing the grid $G_1$ pulses comprises a p-n-p transistor 20 having a base bias resistor 21, the transistor 20 inverting pulses applied to the base electrode thereof via a differentiating network comprising the series connection of a capacitor 22 and a resistor 23, both of which are shunted by a capacitor 24. Input to the differentiating network is derived from the normally provided tube blanking arrangement which also supplies pulses to the tube blanking circuit 25 known per se. The time constant of the capacitor 22 and resistor 23 combination is chosen to be relatively short so that the effect of the long duration field blanking pulse on transistor 20 is virtually eliminated. Output potential from the transistor 20 collector electrode is developed across variable resistor 26 and fixed resistor 27, and supplied to the grid $G_1$ of the tube via a diode OR gate, comprising diodes 28, 33 and a resistor 29, and an output terminal 30. By rendering the resistance of resistor 26 variable the amplitude of the grid $G_1$ pulses are made adjustable. The normally supplied grid $G_1$ potential is applied through the intermediary of a n-p-n transistor 31 having a base current limiting resistor 34, a smoothing capacitor 32 and the gate diode 33 to mix with the pulses at the terminal 30; the diode OR gate causing the potential at the terminal 30 to follow whichever input to the diodes 28 or 33 is the more positive.

The potentials and component types and values shown in FIG. 4 are shown by way of example only and it will be appreciated by those skilled in the art tht numerous other circuit arrangements may be utilised to provide the required positively-going pulses to the grid $G_1$.

By pulsing the grid $G_1$ the beam current is increased thereby providing an increase in the number of positive gas ions which accumulate on the electron beam scanned side of the target so that an increase in pedestal potential is produced. Further, it is known in conventionl pyroelectric tubes that during the tube lifetime the gas pressure reduces so that a fall in pedestal potential results, since fewer positive gas ions are produced by the beam. However by employing the present invention this defect may be at least partially mitigated by increasing the amplitude of the grid $G_1$ pulse to compensate for the drop in the number of positive gas ions which is produced by the reduction in gas pressure. Additionally with the conventional method of operating gas filled pyroelectric tubes a compromise was required between the electron beam current level needed just to discharge the highest positive charges on the target and that (higher) level needed to produce a sufficient pedestal potential to allow small varying chrges on the target to be discharged quickly. This problem is substantially reduced by the present method of operation since the beam current may be reduced, i.e. grid $G_1$ potential may be made more negative, while the beam is discharging the target, without affecting the pedestal potential since this is now controlled by the positive applied pulses during line flyback.

We claim:

1. A circuit arrangement including a pyroelectric camera tube having an electron beam emitting cathode, a control grid $G_1$ controlling the electron beam and a gas in the interior space of the tube for producing a pedestal potential and pulse generator means for producing a positively-going pulse to the grid $G_1$ during each period of line blanking whereby an increased pedestal potential is produced.

2. A circuit arrangement as claimed in claim 1 wherein the gas employed in the tube is inert gas.

3. A circuit arrangement as claimed in claim 1 wherein the gas employed in the tube is hydrogen gas.

4. A circuit arrangement as claimed in claim 1 wherein the amplitude of the positively-going pulses is adjustable.

5. The method of operating a pyroelectric camera tube having an electron beam emitting cathode, a target, scanning mechanism causing the electron beam repetitively to scan the target, a control grid controlling the electron beam and a gas in the interior space of the tube, which comprises the steps of:
   a. periodically applying line blanking pulses to the cathode to ensure that the cathode is positive with respect to the target so that the electron beam does not land on the target during line flyback; and b. applying a positive-going pulse to the grid during each line flyback whereby an increased pedestal potential is produced at the scanning side of said target due to increased electron beam current and consequent increased gas ionization.

6. A method as claimed in claim 5 wherein the amplitude of the positively-going pulses is adjustable.

7. A circuit arrangement including a pyroelectric camera tube having an envelope, an electron beam emitting cathode, a target, scanning means for causing the electron beam repetitively to scan said target, a control grid controlling the electron beam, and a quantity of ionizable gas in said envelope; means for maintaining the target at near the electron beam emitting cathode potential applied during forward scanning; means for periodically applying a positive line blanking pulse to said cathode to ensure that the cathode is positive with respect to the target so that the electron beam does not land on the target during line flyback; and pulse generating means for applying a positive-going pulse to said grid during each line flyback, which positive-going pulse is of an amplitude greater than the positive pulse applied to the cathode so as to increase the electron beam current during flyback, thereby increasing gas ionization to produce an increased pedestal potential.

* * * * *